March 20, 1956     D. R. DEMALINE     2,738,885
PARKING DEVICE
Filed Feb. 9, 1953     3 Sheets-Sheet 1
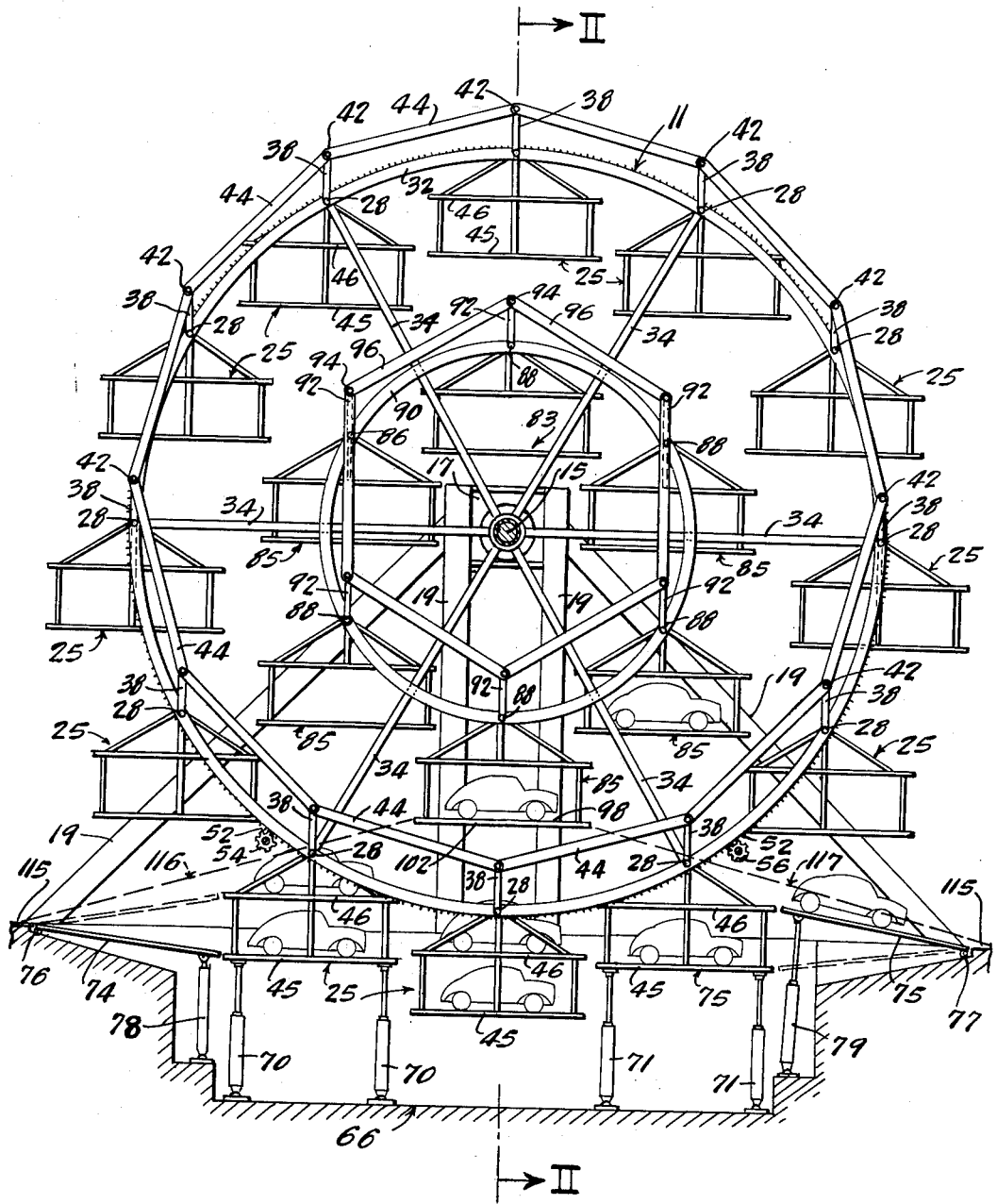
FIG-1-
INVENTOR:
DONALD R. DEMALINE.
BY Hugh A. Kirk
ATTORNEY.

March 20, 1956     D. R. DEMALINE     2,738,885
PARKING DEVICE
Filed Feb. 9, 1953     3 Sheets-Sheet 2
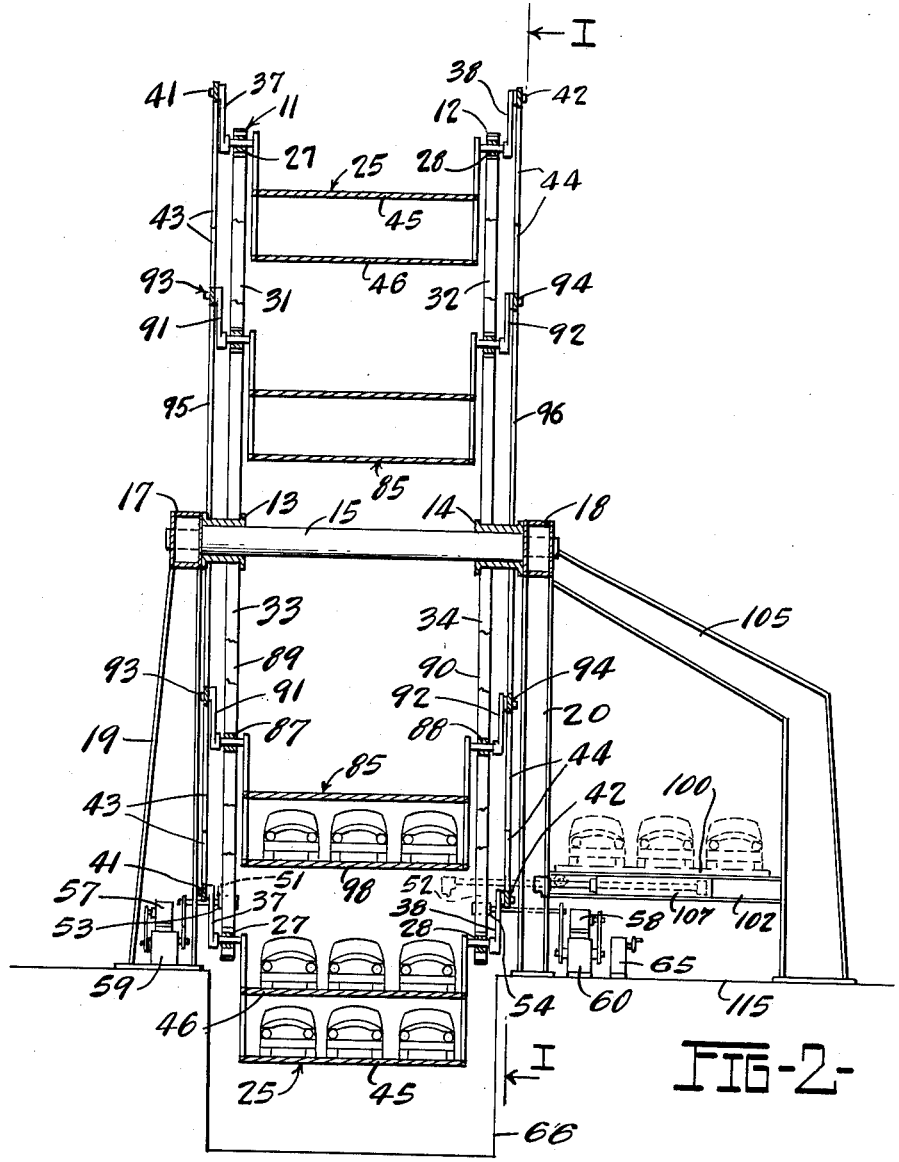
FIG-2-
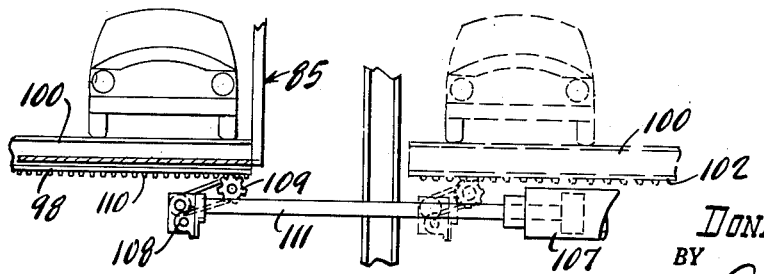
FIG-3-
INVENTOR:
DONALD R. DEMALINE.
BY
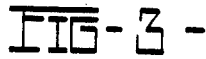
ATTORNEY.

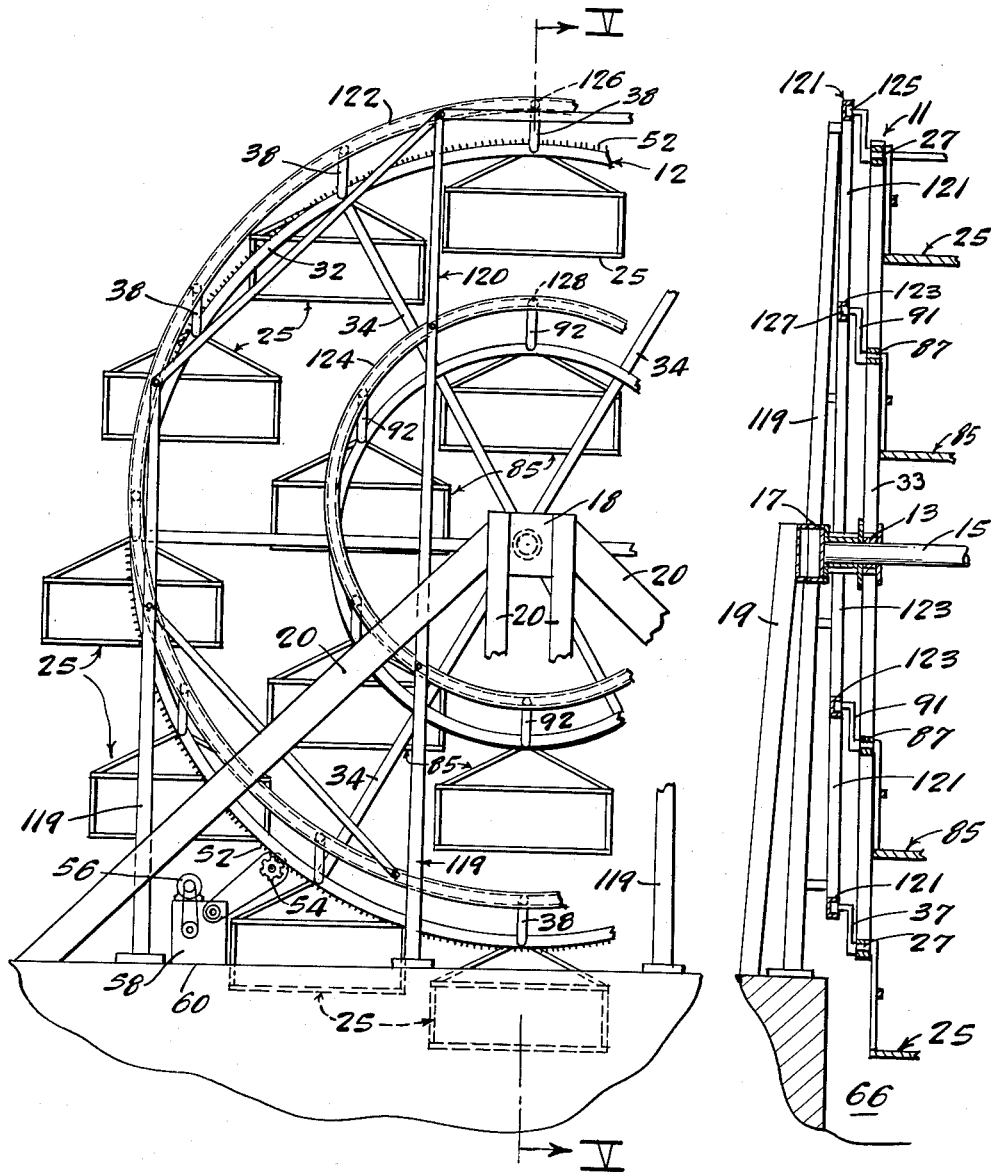

United States Patent Office 2,738,885
Patented Mar. 20, 1956

2,738,885

PARKING DEVICE

Donald R. Demaline, Toledo, Ohio

Application February 9, 1953, Serial No. 335,954

7 Claims. (Cl. 214—16.1)

This invention relates to a parking device for vehicles, such as automobiles. More particularly, it deals with a Ferris wheel type of parking device wherein preferably a plurality of vehicles are parked on each suspended carriage or carrier mounted on the wheel.

It is an object of this invention to produce a parking wheel having suspending carriers for the vehicles parked thereon, which wheel is simple, efficient, effective, safe, automatically controlled, rapidly operating, and relatively compact.

Another object of this invention is to provide a parking wheel wherein the carriers suspended thereon for the vehicles are maintained with their platforms for the vehicles in a horizontal position at all times regardless of the position or rotation of the parking wheel.

Another object is to provide such a parking wheel for vehicles which has a loading and unloading ramp pivoted at one end and adjustable exactly to one or more levels or platforms on a carrier in at least one position of the wheel, for the self loading of the vehicles on said carrier.

Another object is to provide means for locking the wheel as well as the suspended carrier from rotation or motion during loading and unloading of vehicles onto the carrier.

Another object is to provide a parking wheel having a plurality of concentric circular groups of suspended carriers.

Another object is to provide such a parking wheel with a concentric group of suspended carriers in which each of the suspended carriers of the inner concentric circular groups of carriers may be loaded and unloaded parallel to the axle of the wheel, while the carriers in the peripheral group of the wheel may be loaded and unloaded tangentially to the periphery of the wheel.

Generally speaking, the device of this invention comprises a Ferris type wheel of parking device in which the suspended vehicle carriers on the wheel are provided with one or more parallel platforms which are rotatable into one or more rotating positions so that the vehicles may be self loaded and unloaded onto said platforms. Means are also provided for maintaining the platforms on each of the carriers continuously in a horizontal position regardless of the distribution of the weight on the platform or the position of the platforms around the wheel. Means may also be provided, such as a pivoted ramp, for loading one or more platforms of a given one of the suspended carriers from the same position of rotation of the parking wheel. Furthermore, means are provided for clamping the carrier in its loading and/or unloading position so as to prevent its rotation about its suspended pivot as well as the rotation of the wheel itself during loading and unloading.

When an inner concentric circle of suspended carriers is also provided, means such as a sliding dolly which slides axially parallel to the axis of the rotating wheel may be provided in one of the loading and unloading positions, for sliding the vehicles on the dolly from the platform of each of the inner suspended carriers.

The above mentioned and other features and objects of this invention and the manner of attaining them are given more specific disclosure in the following description of embodiments of the present invention taken in conjunction with the accompanying drawings, wherein:

Fig. 1 is a schematic side elevation of one embodiment of a parking wheel according to the present invention, showing two concentric rings of suspended vehicle carriers, and two supporting platforms on each of the carriers of the outer ring, as well as the means for clamping the carriers in position during loading and unloading, or a section taken along line I—I of Fig. 2;

Fig. 2 is a vertical section taken along the center line II—II of Fig. 1, showing the mechanism for loading and unloading the inner circle of suspended carriers;

Fig. 3 is an enlarged side view of the dolly loading and unloading mechanism for the center ring of carriers, with adjacent parts of the wheel and its supporting frame broken away;

Fig. 4 is a side elevation, with parts broken away, similar to that of Fig. 1, of another embodiment of the means for maintaining the platforms of the suspended carriers continuously in a horizontal position; and Fig. 5 is a partial vertical section taken along line V—V in Fig. 4, showing the crank arms on the suspended carriers and their cam followers in the cam channels.

*The wheel and support*

Referring to Figs. 1 and 2, the primary parallel carrier supporting wheels, or spiders, 11 and 12 are preferably made of steel frame work, and may be provided with central co-axial bearings 13 and 14 journaled on a common axle or shaft 15. This shaft 15 may be supported at its ends outside of the wheels 11 and 12 in stationary bearings 17 and 18, rigidly mounted upon supporting means such as the inverted V and/or A frames 19 and 20. These stationary frames 19 and 20 are preferably anchored in reinforced concrete foundations, and are shown in the enclosed embodiment to be approximately equal in height to the radius of the carrier wheels 11 and 12.

*The outer circle of carriers and stabilizing means*

Around the periphery of the carrier wheels, at equally spaced angular distances, are provided suspending pivots or bearings for the outer circle of suspended carriers 25, of which there are shown in Fig. 1 to be twelve, having spaced pivots 27 and 28 mounted, respectively, in peripheral rings or rims 31 and 32 and preferably at the ends of the radial arms 33 and 34 of the wheels 11 and 12. The peripheral rings 31 and 32, however, may be twelve sided parallel polygons formed by straight girders between the pivot points 27 and 28, respectively. Although the pivots 27 and 28 of the suspended carriers 25 are axially aligned common parallel axes, an axle does not extend between them so as to permit as much space as possible on each carrier 25 for the storage of vehicles.

Rigidly connected with at least one and preferably both stub axles of the pivots 27 and 28, which pivots also are rigid or keyed to their carriers 25, are upwardly extending crank arms 37 and 38, respectively. The outer ends of these crank arms 37 and 38 may be provided with pivots 41 and 42, respectively, between adjacent pivots of which on each wheel 11 and 12 may be connected rigid links 43 and 44. Thus, all of said links 43 are connected together as are all of said links 44, so that if anyone of the carriers 25 tends to tilt around its suspended pivots 27 and 28, it will tend to tilt and rotate the crank arms 37 and 38 of all of the carriers through said links 43 and 44. But since the momentum of all the carriers is so great, each of the carriers will correspondingly tend to steady each of the other carriers and thus maintain them all in the same and a horizontal position, because each of the carriers has its center of gravity at all times below its suspending axis defined by the pivots 27 and 28.

In order to conserve as much space as possible, the outer periphery of carriers 25 may each be provided with two platforms 45 and 46, the upper platform 46 of which is placed a distance sufficiently below the axis formed by the pivots 27 and 28 so that the center of gravity of any vehicle placed on this platform will still maintain the center of gravity of the whole carrier 25 below the axis of said pivots 27 and 28. This distance therefore need not be much over half the height of the ordinary automobile or vehicle stored on the parking device of this invention. The distance between the platforms 45 and 46 should be sufficient to permit an automobile of maximum height to freely enter the space between said platforms.

Furthermore, to conserve as much space as possible, it is desired that the platforms 45 and 46 be sufficiently long so as to accommodate more than one vehicle, say for example three as shown in the drawings, however, this may be increased to four or five or reduced to two, as desired, depending upon the width of the lot or property upon which the parking device is to be placed. In any event, the longer the platforms 45 and 46, the more rigid they must be constructed so as to support the weight of the maximum number of vehicles which could be placed on them.

The driving mechanism

Preferably around or near the peripheral rings 31 and/or 32 of the wheels 11 and 12, respectively, there is provided a ring gear or gears 51 and 52, which gears intermesh with one or more pinion gears 53, 54, 55 and 56, preferably located near the ground or base of the wheel. Each pinion gear may be driven by a separate motor, such as 57 and 58 shown in Fig. 2, through suitable gear reduction devices 59 and 60, respectively. All of these motors may be controlled by a single controller 65 (shown in Fig. 2), which controller may be automatically adapted to only stop the rotation of the wheels 11 and 12 in the position shown in Fig. 1, namely at the loading and unloading ramps or stations described later. Thus since there are twelve exterior or peripheral suspended carriers 25, there are provided only twelve corresponding stopping positions for the wheels 11 and 12. The mechanism for automatically controlling the rotation of the wheels 11 and 12 and their suspended carriers may be similar to the control device described in the Lewis Patent 1,856,876, in which a circuit means is disclosed for automatically calling to the desired loading and/or unloading station the carrier over the shortest arcuate route. Thus, the motors or gear reduction devices for rotating the wheel should be reversible, and may be controlled by a circuit mechanism operated by push buttons controlled by only one operator or attendant for the parking device. However, since the exact control circuit for this device is not a part of the present invention, any similar schematic electrical control mechanism commonly known for systems of the present type may be employed without departing from the scope of the present invention.

Tangential loading and unloading devices

Fig. 1 also shows a pit 66 which may be excavated to lower the overall height of the parking device and permit ground level loading and unloading of the carriers as well as to permit the free suspension of the outer periphery of carriers 25, and provide a place for the hydraulic carrier locking means. This locking means may comprise two pairs of hydraulic cylinder and piston mechanisms 70 and 71, which are mounted in the pit 66 and may be extended to clamp against the under side or bottom of the lower platforms 45 of each of the loading and unloading suspended carriers 25, when it is in one of the twelve stopping positions for the wheel. These hydraulic jacks or clamping mechanisms 70 and 71, are thus automatically brought into their locking positions shown in Fig. 1 as soon as the rotating wheel is stopped in one of its positions, and said mechanisms 70 and 71 are accordingly retracted and maintained retracted as soon as the wheel is to be rotated and during its rotation. The means for controlling the automatic jacks 70 and 71 may be connected directly with the controller 65 shown in Fig. 2. Thus, when both ends of the pivoted suspended carriers 25 are engaged by the jacks 70 and 71, these carriers are correspondingly prevented from tilting about their pivots 27 and 28, and correspondingly the whole wheel is also prevented from rotation.

Since the embodiment shown discloses a pair of superimposed platforms 45 and 46 on each of the carriers 25, there may be provided ramps 74 and 75 pivoted at ground level by hinges 76 and 77 located at either side of the wheel for the two loading and unloading carriers 25 clamped by the hydraulic jacks 70 and 71. These pivoted ramps 74 and 75 may be operated, respectively, by hydraulic piston mechanisms 78 and 79, to move the ramps from their full line positions shown into their dotted line positions, so as to cooperate with either one of the platforms 45 and 46 depending upon which platform is to be loaded or unloaded with one or more vehicles. Similarly, the operation of the hydraulic piston mechanisms 78 and 79 for the ramps 74 and 75 may be automatically controlled by the controller 65 according to the platform location of the vehicle to be loaded or unloaded.

Inner circle of carriers

In the embodiments disclosed, there is also shown an inner ring or circle of suspended carriers 85, of which there are only shown six instead of twelve, since there is not sufficient room for the same number of carriers as there is in the outer circle of the wheel. Furthermore, each of the carriers 85 are only provided with a single platform for carrying vehicles. The carriers 85 may be suspended from pivots 87 and 88, respectively, located around rings 89 and 90, concentric with the rings 31 and 32 of the peripheral series or circle of suspended carriers 25. However, the pivots 87 and 88 are preferably only located on every other one of the radial spiders 33 and 34, since there are only half the number of carriers 85 as there are carriers 25. The axis defined by the pivots 87 and 88 may or may not extend across and between the two wheels 11 and 12, but fixed with each carrier 85 there is at least one and preferably two upwardly extending crank arms 91 and 92, corresponding respectively to the crank arms 37 and 38. These crank arms may be connected at their ends by pivots 93 and 94, respectively, to links 95 and 96 corresponding, respectively, to the links 43 and 44.

Thus, these links 95 and 96 maintain all of the suspended carriers 85 in the same and a horizontal position during the rotation of the wheels 11 and 12, for the reason described above regarding carriers 25.

Inner circle carrier loading and unloading device

As shown in Fig. 2, the supporting structure 20 for the bearing 18 on one side of the wheels 11 and 12 may have legs spread sufficiently apart at the level of the platform 98 of the lowest suspended carrier 85 to permit a dolly 100 to slide parallel to the axis of the axle 15 onto and off of said supporting platform 98. An additional support for the bearing 18 and for a loading and unloading platform 102 for supporting the dolly in its dotted line position as shown in Figs. 2 and 3 may be provided by supporting members 105. If each of the carriers 85 are provided with similar dollies 100, a common mechanism mounted on the end of a hydraulic piston 107, as shown in Fig. 3, comprising an electric motor 108 driving a pinion gear 109 which intermeshes with a rack 110 on the bottom of the dolly 100, may be operated to extend the motor 108 on the end of the piston rod 111 so that the gear 109 will mesh with one end of the rack 110 and then the motor 108 may be started to slide or roll the dolly 100 across the gap between the platforms 98 and 102, so that all three of the vehicles shown on the dolly 100 may be pulled off onto the platform 102. Platform 102 may be connected from either or both sides by ramps to the ground level 115, such as shown by the dotted line ramps 116 and 117 in Fig. 1. Thus, the vehicles or automobiles which may be stored in the device according to this invention may be loaded onto and unloaded from the device in the same direction without requiring additional space for turning of the vehicles, even to feed them onto the carriers 85 at right angles to the vehicles supported on the carriers 25.

Since there are half as many carriers 85 as there are carriers 25, the mechanism shown in Figs. 2 and 3 for loading and unloading vehicles onto the carriers 85 will only take place at every other predetermined stop of the wheels 11 and 12, and the mechanism 107 may correspondingly be connected through the controller 65 to automatically operate this device as well as the hydraulic dolly sliding mechanism 107 and 108 if the vehicle called or to be placed is for the inner circle of supporting carriers.

Modified carrier stabilizing means

Another form of horizontal stabilizing means may be provided for the carriers from that shown and primarily described in Figs. 1 and 2, namely one in which each of the crank arms 37, 38, 91 and 92 keyed to the carriers is guided in a separate frame or frames along cam channels or slots. Such a modification is shown in Figs. 4 and 5, wherein similar parts are given the same reference characters as those previously described.

In Figs. 4 and 5 in addition to the supporting frames 19 and 20, there may be constructed one or more additional frames 119 and 120, upon which are supported two concentric circular guides or cam paths or channels for each side of the wheel, namely, cam paths 121 and 123 for wheel 11, and cam paths 122 and 124 for the wheel 12. These concentric cam paths are rigidly attached to the ground or foundation for the device and/or to the supporting frames 19 and 20, and are of the same size and circumference as the wheels, however, they are placed around an axis parallel to the axis of the axle 15 which axis is away from or above the axis 15 corresponding to the length of the crank arms 37, 38, 91 and 92. The outer end of these crank arms, which previously supported the pivots 41, 42, 93 and 94, respectively, are now provided with separate cam followers or rollers 125, 126, 127 and 128, which ride in the cam paths 121, 123, 124 and 125 and thus maintain the crank arms continuously and at the same angle to the ground or in a vertical position (as shown), which correspondingly maintains the platforms or all the carriers 25 and 85 continuously in a horizontal position. This means of maintaining the level position of each carrier is more positive than the links 43, 44, 95 and 96 shown in Figs. 1 and 2, however, it is a more expensive arrangement because it requires the additional rigid frames 119 and 120 mounted on each side of the wheel. However, the additional security and safety in preventing the tilting in unison of all of the carriers in a series circle is hereby positively prevented, and if desired the system shown in Figs. 1 and 2 with the links may also be combined with the cam follower system shown in Figs. 4 and 5, so that both means of preventing oscillation or swinging motion of the suspended carriers 25 and 85 will be further insured. Thus, vehicles which are placed on the carriers will maintain their position by merely setting the brakes of the vehicle, and no separate vehicle anchoring devices on each carrier platform are required.

General operation of the wheel

If a device is shown of the type described wherein an inner circle of suspended carriers 85 is also employed together with the outer circle of carriers 25, there probably would be required at least one additional attendant for the parking device on the platform 102 at least during rush hours, as well as the regular one attendant at the loading platform or ramp 74 for the outer circle. It would not be necessary, however, to provide an attendant at the discharge ramp 75 for the outer circle since the person parking his or her car must see one of the attendants to pay, which one attendant could press the corresponding button on the controller 60 to call his or her car, and thus that person's car would be automatically brought to the ramp 75 so that all that person would have to do would be to walk over the ramp 75 and enter his or her car and drive it off the carrier himself or herself. Thus each car owner could park and lock his own car on the device. It is advantageous that in such a device the lot or piece of ground upon which the device is installed, would have access thereto both from the front end and back end thereof. However, if desired, access at one end still could be provided in that the vehicles could be backed off the loading ramps 74 and 116 for unloading.

It is easily conceivable in a device of the size herein described that within about 60 seconds any vehicle could be called and brought for unloading from the most remote carrier from the unloading station. The fact that the parking wheel may rotate in either direction and also the fact that a plurality of cars may be stored on each carrier, materially reduces the time within which any car or vehicle may be loaded or unloaded from the wheel.

For example, assuming that a parking wheel according to the present invention was built to scale, and that a space was provided of 6 x 8 x 20 feet for each vehicle on each of the platforms of the carriers, the whole device could readily be installed on a lot having the dimensions of 60 x 110 feet, which lot could then store 90 automobiles on the wheel itself, besides an additional number which could be parked temporarily on the ramps in case of emergency, all of which automobiles would be easily accessible. While if the same lot or tract of land were required to park cars on one and the ground level with no spaces between the cars and no ready accessibility of the cars, less than half this number of automobiles could be parked, and with ready accessibility only a quarter as many cars.

If desired, the device of this invention may be constructed without an inner circle of suspended carriers 85, under which condition the weight of the whole device could be decreased and the size of the lot upon which the device would be placed could be divided in half, namely 30 x 60 feet as mentioned above in the specific example. However, if a wider lot were provided, longer platforms could also be provided on the wheel which would materially increase the capacity of the storage on the lot of the size required, that is by twelve cars each 8 feet increase in width.

Although the device has been shown to be driven by mechanical means around or adjacent the periphery of the wheel by separate motors, this may be revised by placing a motor geared to the axle 15; or the axle 15 may be eliminated entirely and the whole device may be supported upon the ring gears 51 and 52, without departing from the scope of this invention. Also the hydraulic mechanisms 70, 71, 78 and 79 may be replaced by separate and permanent ramps to each of the levels or platforms 45 and 46 of the outer ring of carriers 25, if desired.

While there is described above the principles of this invention in connection with specific apparatus, it is to

What is claimed is:

1. A parking wheel for automobiles comprising outer and inner rings of carriers, said outer ring having plural platforms on each carrier, means for rotating said wheel so that each carrier on each ring may be brought to a predetermined loading and unloading station, separate means for loading and unloading both said rings of carriers in directions parallel to the plane of rotation of said wheel, comprising: a pivoted ramp means cooperating with each platform of said outer ring carrier positioned at its loading and unloading station to load and unload said platforms through the periphery of the outer ring, a fixed ramp means along the side of said wheel extending parallel to said pivoted ramp means and extending to a loading and unloading station for the carriers of said inner ring, and means movable parallel to the axis of said wheel between the carriers of the inner ring and said fixed ramp means for loading and unloading automobiles, whereby automobiles only have to drive along said ramp means for loading and unloading both rings of carriers.

2. A parking wheel according to claim 1 wherein said means movable parallel to the axis of said wheel for loading and unloading said inner ring carriers comprises a dolly mounted on each inner ring carrier.

3. A parking wheel according to claim 2 including means mounted on said fixed ramp means adjacent its corresponding loading and unloading station to engage and move said dollies.

4. A parking wheel according to claim 1 wherein said wheel comprises parallel circular spider frames mounted on a common axle with said carriers for said automobiles suspended between said frames from equally angular spaced parallelly aligned pairs of pivots around said concentric rings.

5. A parking wheel according to claim 1 wherein said means for rotating said wheel includes means for reversing said wheel to move it to any one of a given number of positions corresponding to the number of said suspended carriers in said outer ring of carriers.

6. A parking wheel according to claim 1 wherein said wheel comprises a pair of parallel frames mounted on a common horizontal axis supported on stationary bearings located about the radius of said wheel above its ground level.

7. A parking wheel according to claim 1 including means for maintaining all of said carriers horizontal regardless of their position on said wheel.

References Cited in the file of this patent

UNITED STATES PATENTS

| | | |
|---|---|---|
| 236,836 | Palmer | Jan. 18, 1881 |
| 853,155 | Boardman | May 7, 1907 |
| 1,524,505 | Blue | Jan. 27, 1927 |
| 1,619,966 | Blackham et al. | Mar. 8, 1927 |
| 1,800,059 | Egan | Apr. 7, 1931 |
| 1,867,675 | McHenry et al. | July 19, 1932 |
| 1,870,069 | Rugg | Aug. 2, 1932 |
| 1,931,402 | Black | Oct. 17, 1933 |
| 1,978,205 | Ide | Oct. 23, 1934 |
| 2,149,439 | Hatch | Mar. 7, 1939 |
| 2,161,750 | Schonwald | June 6, 1939 |
| 2,297,199 | Buddecke | Sept. 29, 1942 |
| 2,670,860 | Cogings | Mar. 2, 1954 |
| 2,704,609 | Zeckendorf et al. | Mar. 22, 1955 |